Figure 6:
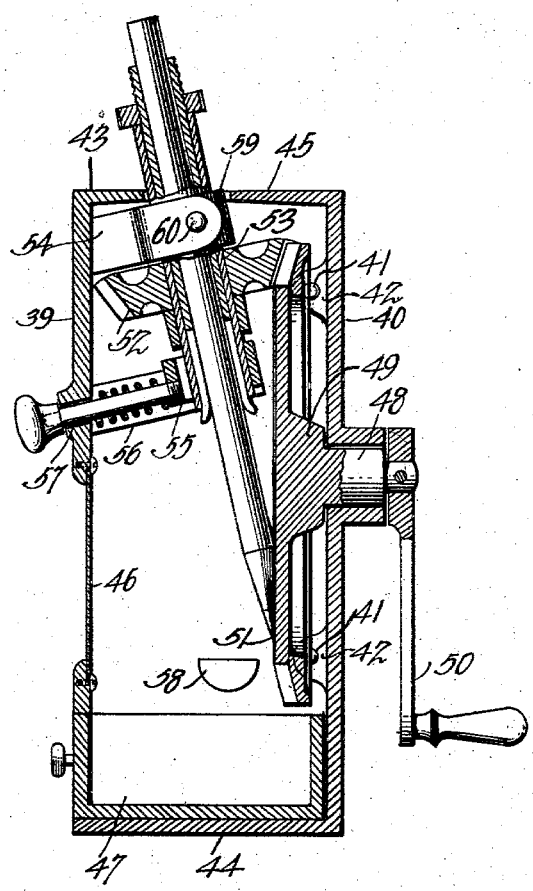

No. 740,881. PATENTED OCT. 6, 1903.
C. F. LITTLEJOHN.
PENCIL SHARPENER.
APPLICATION FILED OCT. 15, 1902.
NO MODEL. 2 SHEETS—SHEET 1.
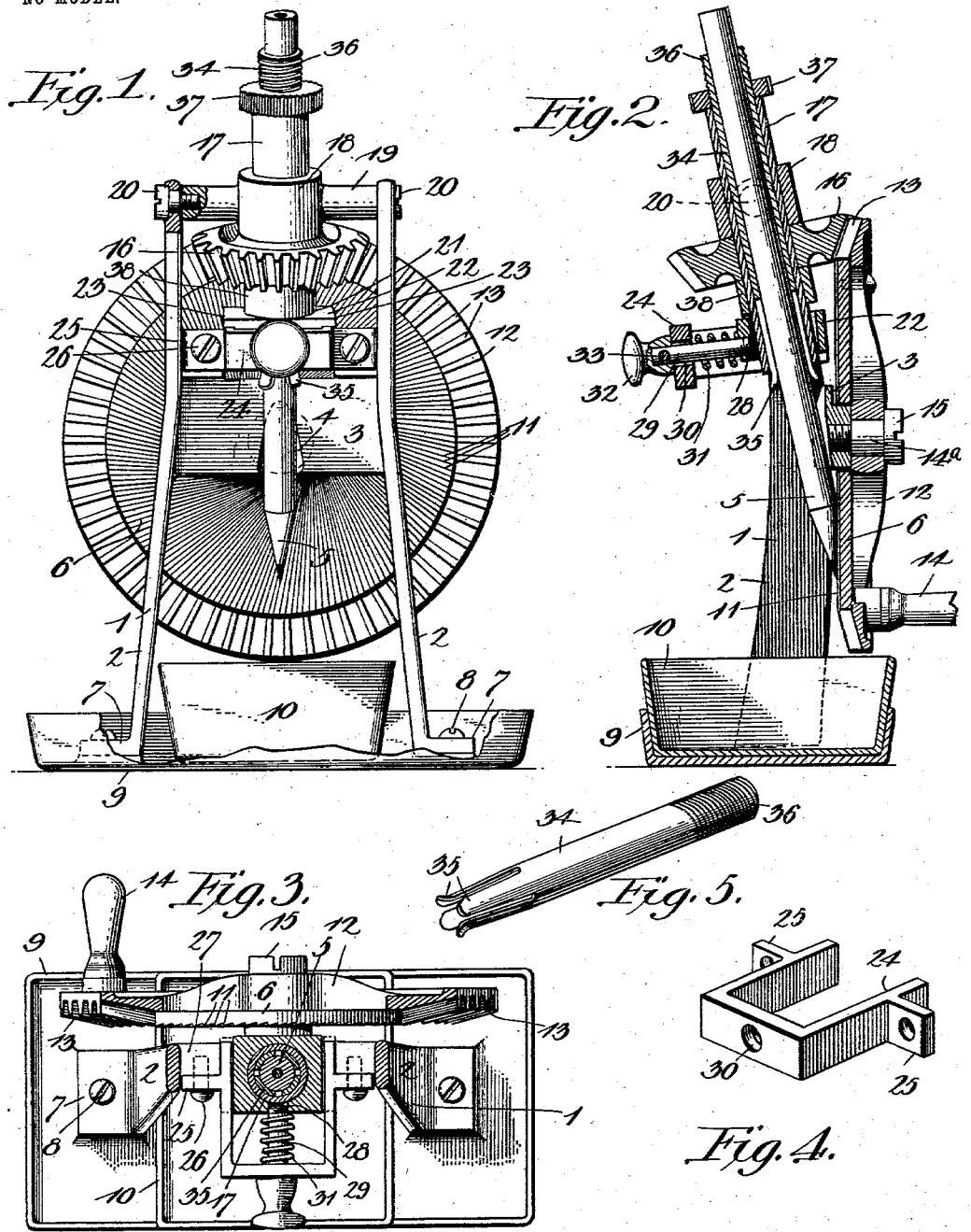
Witnesses
C. F. Littlejohn, Inventor.
by
Attorneys No. 740,881. PATENTED OCT. 6, 1903.
C. F. LITTLEJOHN.
PENCIL SHARPENER.
APPLICATION FILED OCT. 15, 1902.
NO MODEL. 2 SHEETS—SHEET 2.

Witnesses
E. F. Stewart
J. F. Riley

C. F. Littlejohn, Inventor.
by C. A. Snow & Co.
Attorneys

No. 740,881. Patented October 6, 1903.

UNITED STATES PATENT OFFICE.

CHARLES F. LITTLEJOHN, OF NEW HAVEN, CONNECTICUT, ASSIGNOR TO ISABEL A. LITTLEJOHN, OF NEW HAVEN, CONNECTICUT.

PENCIL-SHARPENER.

SPECIFICATION forming part of Letters Patent No. 740,881, dated October 6, 1903.

Application filed October 15, 1902. Serial No. 127,413. (No model.)

*To all whom it may concern:*

Be it known that I, CHARLES F. LITTLEJOHN, a citizen of the United States, residing at New Haven, in the county of New Haven and State of Connecticut, have invented a new and useful Pencil-Sharpener, of which the following is a specification.

The invention relates to improvements in pencil-sharpeners.

The object of the present invention is to improve the construction of pencil-sharpeners and to provide a simple and comparatively inexpensive one of great strength and durability adapted to be readily operated and capable of rapidly sharpening or pointing pencils without liability of breaking the lead.

A further object of the invention is to provide a machine of this character adapted to yieldably support a pencil in engagement with a cutting, abrading, or grinding surface of a rotary reducing disk or wheel and capable of permitting the pencil to be readily adjusted longitudinally to secure a point of the desired length.

The invention consists in the construction and novel combination and arrangement of parts hereinafter fully described, illustrated in the accompanying drawings, and pointed out in the claims hereto appended.

In the drawings, Figure 1 is an elevation of a pencil-sharpener constructed in accordance with this invention. Fig. 2 is a central vertical sectional view. Fig. 3 is a horizontal sectional view. Fig. 4 is a detail view of the guide. Fig. 5 is a detail view of the clamping portion of the adjustable sleeve or chuck. Fig. 6 is a vertical sectional view illustrating a modification of the invention.

Like numerals of reference designate corresponding parts in all the figures of the drawings.

1 designates a supporting-frame composed of two sides or standards 2 and an intermediate connecting bar or portion 3, which is slightly bowed to present a concave inner face, and the latter is provided with a central groove 4, curved in cross-section and tapered toward the top, as clearly shown in Figs. 1 and 2. The groove is adapted to enable a pencil 5 to clear the cross-piece and engage the face of a reducing disk or wheel 6; but the cross-piece may be constructed in any other desired manner to provide a passage for the pencil and to permit the same to properly engage the abrading disk or wheel. The lower ends of the sides or standards of the supporting-frame 1 are provided with perforated ears or feet 7, which are secured by screws 8 or other suitable fastening devices to a base 9, provided with upturned marginal flanges or walls and forming a receptacle for catching any dust which does not fall within a removable tray or pan 10. The removable tray or pan 10 fits between the standards or sides of the supporting-frame and is arranged beneath the pencil and is adapted to catch the dust, and it is removable to enable its contents to be emptied when desired.

The reducing disk or wheel preferably consists of a steel disk provided at its engaging face with cutting edges 11, disposed tangentially to the central perforation, which receives the axle on which the disk rotates, said cutting edges diverging outwardly and forming a file-surface and arranged to commence cutting the pencil at the greatest diameter of the engaged portion of the same, and they travel downward toward the point of the pencil, the rotation of the disk enabling the cutting edges to make a shearing cut. This insures a smooth point and prevents the machine from breaking the lead in sharpening the pencil. The disk is secured to a wheel-frame 12, provided at its periphery with teeth 13 and having a crank-handle 14 and forming a gear-wheel; but the disk may be mounted on and form a part of the wheel in any other desired manner. The wheel is provided with a central opening to receive a bearing portion 14$^a$ of a screw 15, having a head at its outer end and provided with a threaded inner portion of less diameter than the bearing portion 14$^a$ for engaging a threaded perforation of the cross-piece of the frame. The reduced threaded portion of the screw being of less diameter than the remainder thereof forms a shoulder for engaging the supporting-frame to prevent the head of the screw from binding against the drive-wheel. The teeth 13 are arranged at the inner face of the wheel and are set at an angle or inclination to mesh with the teeth of a bevel gear or pinion 16, which is arranged at an inclination and which carries an inclined guide-tube 17. The guide-tube extends above and below the pinion 16, and its upper portion is arranged in a bearing 18 of a cross-piece 19, detachably secured to the upper ends of the sides or standards 2 by screws 20, which form pivots or trunnions, whereby the top cross-piece of the frame is pivotally mounted and is adapted to oscillate to enable the depending portion of the pencil to swing inward and outward to adjust itself properly to the reducing-face of the drive-wheel.

The lower portion of the guide-tube is arranged in an opening 21 of a slide 22, consisting of a block provided with side flanges 23 and arranged in a guide 24. The guide 24, which is disposed at a slight inclination to arrange it at right angles to the inclined guide-tube 17, consists of a rectangular frame open at the inner end and provided at opposite sides with perforated ears 25, which are secured by screws 26 to perforated lugs 27 of the sides or standards of the supporting-frame. The slide is spring-actuated for the purpose of holding the pencil yieldably in engagement with the reducing-wheel, and it is provided at its outer end with a threaded opening 28, receiving the threaded inner end of a stem 29. The stem 29 extends outward through an opening 30 of the guide 24, and it supports a coiled spring 31, located within the guide and interposed between the outer end thereof and the slide. The outer end of the stem is provided with a knob or head 32, having a socket to receive the stem and secured to the same by a pin 33 or other suitable fastening device. The knob or stem is adapted to be readily grasped by the operator when it is desired to draw the point of the pencil away from the reducing-wheel.

Within the guide-tube is arranged a sleeve 34, forming a chuck for holding a pencil or other article to be pointed or sharpened and provided at its lower end with a series of resilient fingers 35, arranged to clamp and hold a pencil and adapted to permit the same to be readily moved upward and downward when the necessary force is applied to adjust the pencil and to remove and introduce the same into the machine. The resilient clamping-fingers are adapted to engage the pencil with sufficient force to prevent the same from accidentally slipping while the machine is in operation. The upper end 36 of the sleeve extends above the guide-tube and is provided with exterior screw-threads for the reception of an interiorly-threaded adjusting nut or ring 37, having a milled periphery and adapted to engage and rest upon the upper end of the guide-tube to prevent the pencil from dropping too far, and the adjusting-nut is adapted to be moved upward to permit the pencil to be gradually advanced against the reducing-wheel.

The pinion 16 is arranged beneath the pivoted bearing 18, and it is supported by a spacing-sleeve 38, arranged on the lower portion of the guide-tube and interposed between the pinion and the slide.

In Fig. 6 of the drawings is illustrated a modification of the invention in which the supporting-frame is in the form of a casing to render the pencil-sharpener dust-proof to prevent the hands of the operator from becoming soiled by operating the machine. The casing is composed, preferably, of front and rear sections 39 and 40, detachably connected by suitable fastening devices 41, extending through perforations of the sides of the front section and engaging perforated ears 42 of the rear section. The sections may be constructed in any desired manner; but the front section is preferably composed of a front wall, side walls, and a portion 43 of the top of the casing. The rear section is composed of the bottom or base 44, a rear wall, and a portion 45 of the top of the casing, the portions 43 and 45 being recessed or cut away at the center to provide an opening for the guide-tube and the pencil-holding sleeve. The front of the casing is provided with an opening which is covered by a transparent plate 46, of glass or any other suitable material, to enable the point of the pencil to be readily seen from the exterior without removing the pencil from the machine. The casing is also provided at its bottom with a removable receptacle, preferably consisting of a drawer 47, to enable the accumulation to be readily removed.

The back of the casing is provided with a suitable bearing for the reception of the shaft 48, upon which the main or upright gear-wheel 49 is mounted and which is provided with a suitable crank-handle 50. The crank-handle is arranged on the exterior of the casing and is adapted to be rotated for operating the machine. The main gear-wheel, which is constructed similar to that heretofore described, is provided with a suitable reducing-disk 51 for engaging and sharpening a pencil. The upright gear-wheel meshes with a beveled pinion or gear 52, arranged at a slight inclination and carrying a guide-tube 53. The guide-tube is arranged within a bearing 59, provided at opposite sides with pivots 60, arranged in bearings of a bracket 54, extending inward from the front section of the frame and arranged at the top thereof.

The lower portion of the guide-tube is arranged within an opening of a slide 55, mounted in a guide 56 and connected with a stem 57. The stem 57 extends through an opening of the casing and is provided at its outer ends with a knob or grip, and a coiled spring is interposed between the front of the casing and the slide.

The supporting-frame of the casing is provided at the lower portion of its front section with a horizontal stop 58, located adjacent to the plane of the lower edge of the reducing-disk and suitably fixed to the casing. This stop is arranged to receive the point of the pencil in placing the latter into the machine, and it forms a guide to prevent the pencil from being interposed too far into the pencil-sharpener.

The transparent plate 46 is detachably secured to the casing, and it may be removed, if desired, to enable a pencil to be seen more clearly through the opening.

It will be seen that the pencil-sharpener is simple and comparatively inexpensive in construction, that it is adapted to be readily operated, and that it is capable of enabling a pencil to be rapidly sharpened without breaking the lead. It will also be apparent that a pencil is yieldably held in engagement with the reducing disk or wheel and that it is capable of ready adjustment to advance it against the same to secure a point of the desired length.

What is claimed is—

1. In a machine of the class described, the combination of a supporting-frame, a wheel provided with teeth and having a reducing-surface, a pivotally-mounted gear meshing with the teeth of the wheel, and provided with means for holding a pencil, and means for yieldably holding a pencil against the reducing-surface of the wheel, substantially as described.

2. In a machine of the class described, the combination of a supporting-frame, a reducing-wheel mounted on the frame and provided with teeth, a pivotally-mounted gear provided with a guide-tube arranged to receive a pencil, said gear meshing with the teeth of the reducing-wheel, and a spring-actuated slide receiving the guide-tube and adapted to hold a pencil yieldably in engagement with the reducing-wheel, substantially as described.

3. In a machine of the class described, the combination of a supporting-frame, a toothed reducing-wheel, a pivotally-mounted gear meshing with the reducing-wheel and having a guide-tube, a guide mounted on the frame, a slide arranged on the guide and receiving the guide-tube, and a spring engaging the slide, substantially as described.

4. In a machine of the class described, the combination of a supporting-frame, an upright reducing-wheel provided with teeth, a gear pivotally mounted at the top of the frame and meshing with the reducing-wheel and provided with an inclined guide-tube, a guide arranged at a slight inclination from the horizontal, a slide mounted in the guide and receiving the guide-tube, and a spring for engaging the slide, substantially as described.

5. In a machine of the class described, the combination of a frame, a reducing-wheel provided with teeth, a pivotally-mounted gear having a guide-tube and meshing with the reducing-wheel, an approximately rectangular guide mounted on the frame, a slide arranged in the guide and having an opening receiving the guide-tube, a stem connected with the slide and a spring for engaging the slide for holding a pencil yieldably in engagement with the reducing-wheel, substantially as described.

6. In a machine of the class described, the combination of a base forming a receptacle, a frame mounted on the base and provided with sides, a bearing pivotally mounted and located between the sides and having a bearing-opening, a reducing-wheel provided with teeth, a pinion meshing with the reducing-wheel and having a guide-tube arranged in the bearing-opening, a guide mounted on the frame and located below the pinion, a slide arranged within the guide and having an opening receiving the guide-tube, a spring engaging the slide and an adjustable chuck for holding a pencil, substantially as described.

7. In a pencil-sharpener, the combination of a revoluble member having a reducing-surface, a revoluble pencil-holder pivotally mounted for swinging movement toward and from the plane of the reducing-surface, intermeshing gear-teeth carried by the holder and said member, and means for yieldably holding a pencil against the reducing-surface of the member.

8. The combination of an upright reducing-wheel provided with gear-teeth, a pivotally-mounted gear meshing with the reducing-wheel and arranged at an acute angle to the same and provided with means for holding a pencil, and means for yieldably holding the pencil in engagement with the reducing-wheel, substantially as described.

9. The combination of a casing, an upright reducing-wheel mounted within the casing and provided with gear-teeth, a gear meshing with the reducing-wheel and provided with means for holding a pencil, and a removable receptacle arranged within the casing to receive the dust, substantially as described.

10. In a machine of the class described the combination of a casing provided with a transparent portion and having a removable dust-receptacle, a reducing-wheel located within the casing and provided with gear-teeth and a gear meshing with the reducing-wheel and provided with means for holding a pencil, substantially as described.

11. The combination of a casing provided with a bracket, an upright reducing-wheel located within the casing and provided with gear-teeth, a bearing pivotally mounted in the bracket, and a gear journaled in the bearing and meshing with the reducing-wheel and provided with means for holding a pencil, substantially as described.

12. In a machine of the class described the combination of a supporting frame or casing provided with an opening, a reducing-wheel having gear-teeth and arranged within the casing and provided with means for operating it from the exterior of the same, a pivotally-mounted gear-wheel meshing with the reducing-wheel and provided with means for holding a pencil, and a spring-actuated device for holding the pencil in engagement with the reducing-wheel, said spring-actuated device being provided with means for operating it from the exterior of the casing, substantially as described.

In testimony that I claim the foregoing as my own I have hereto affixed my signature in the presence of two witnesses.

CHARLES F. LITTLEJOHN.

Witnesses:
JOHN T. MUNIGLE,
TINA M. LA FIRGE.